C. A. KUENZEL.
AIRSHIP.
APPLICATION FILED APR. 21, 1910.
987,380.
Patented Mar. 21, 1911.
7 SHEETS—SHEET 7.
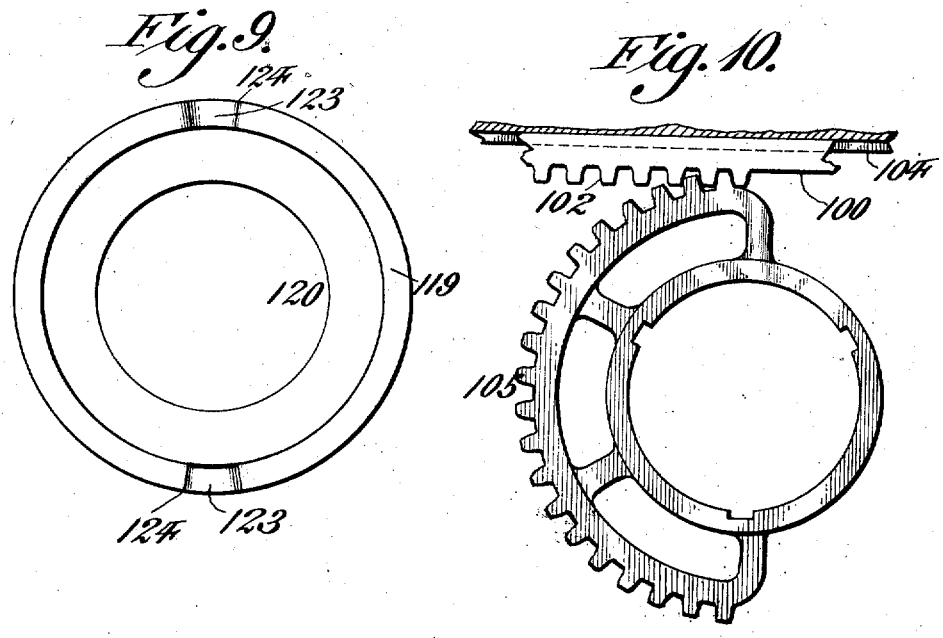
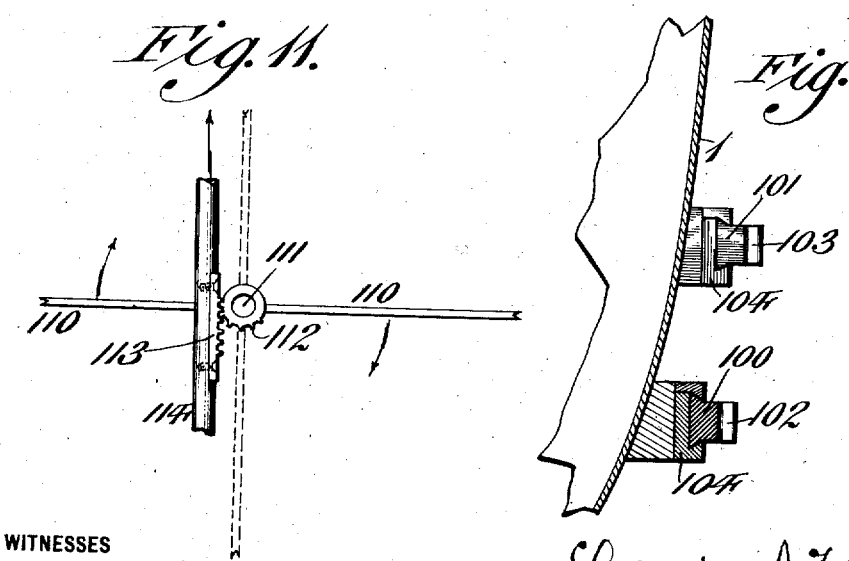
WITNESSES
L. Douville,
P. F. Nagle.
INVENTOR
Charles A. Kuenzel.
BY
Niedersheim + Fairbank
ATTORNEYS

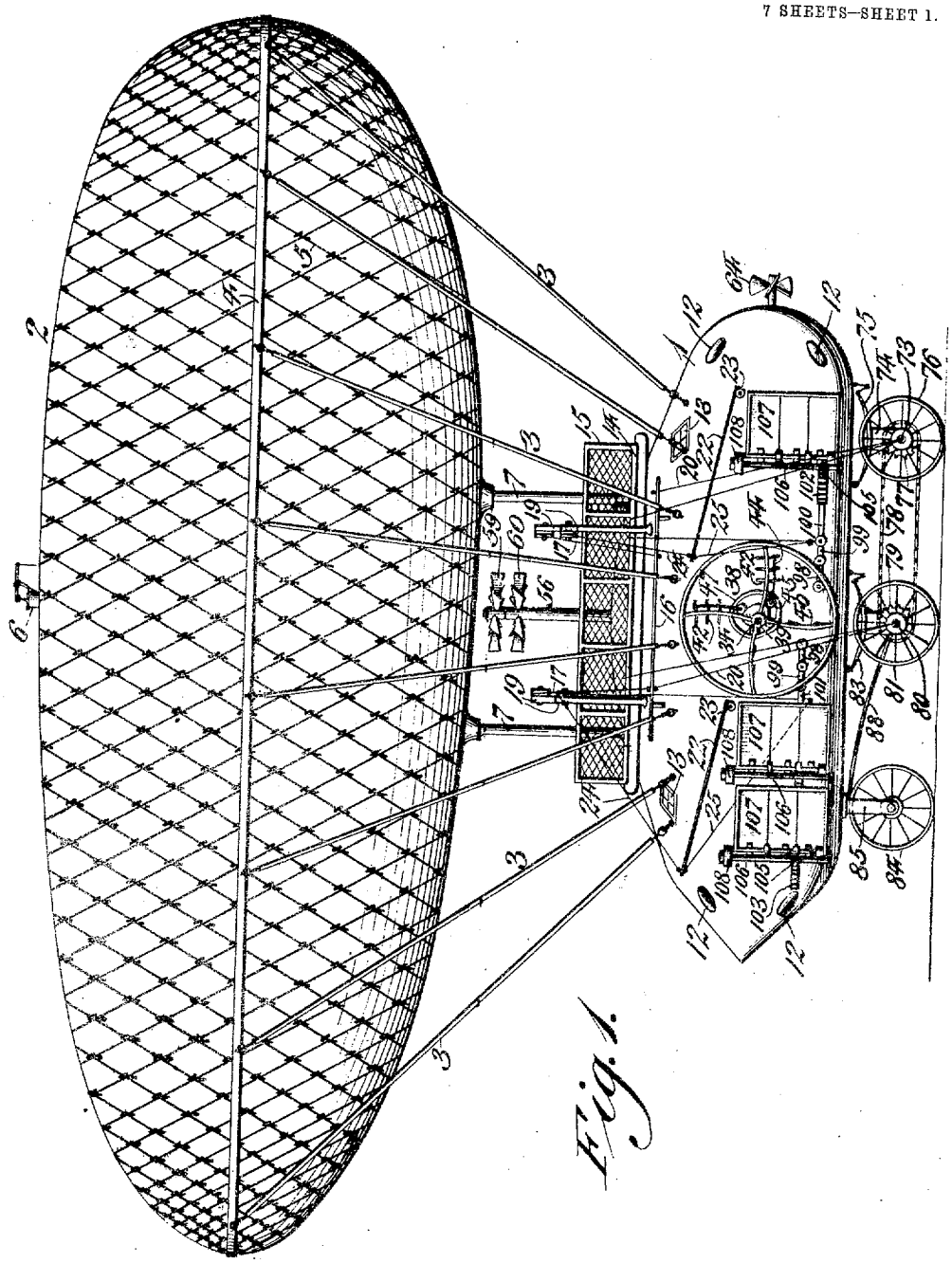

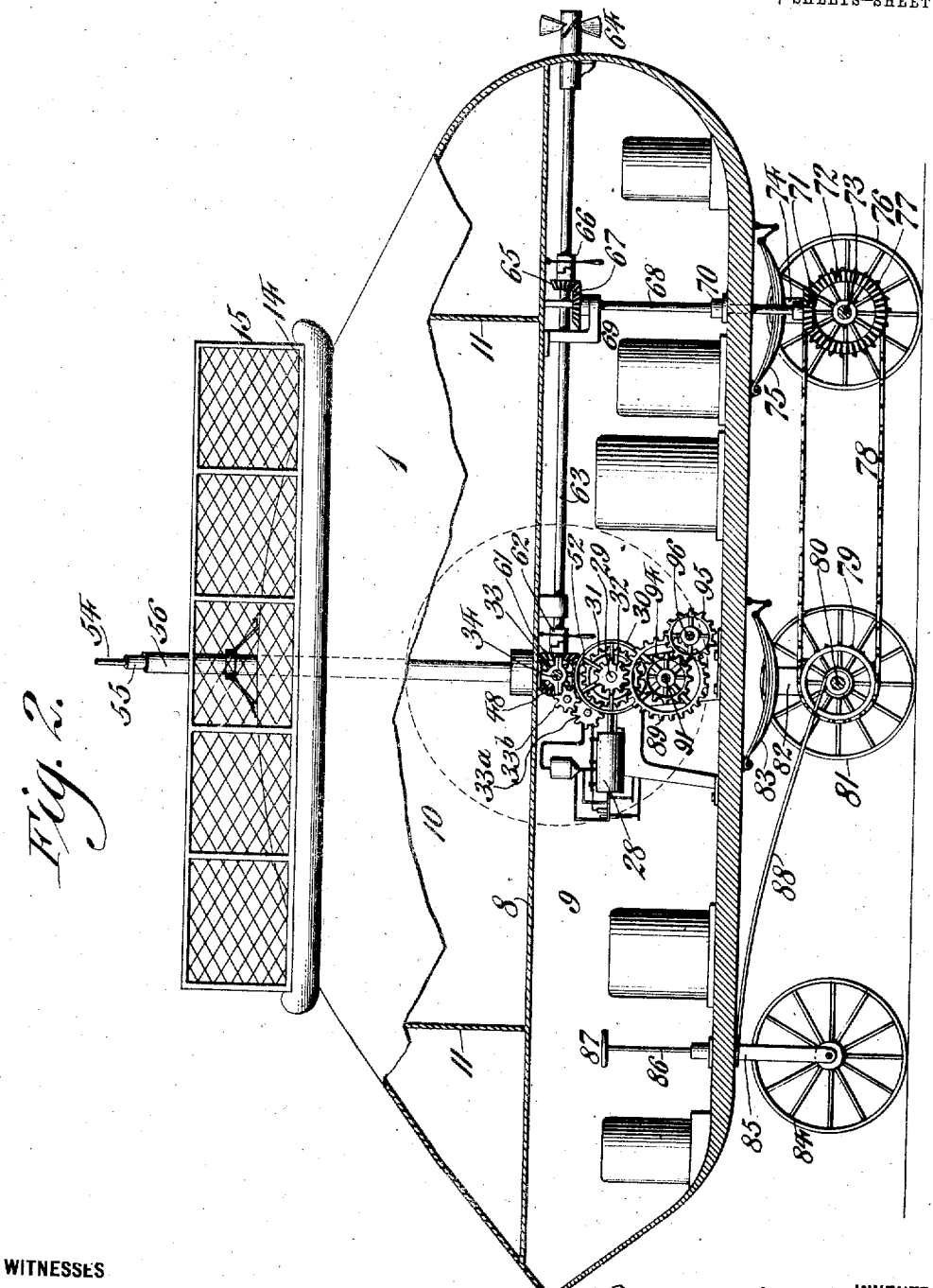

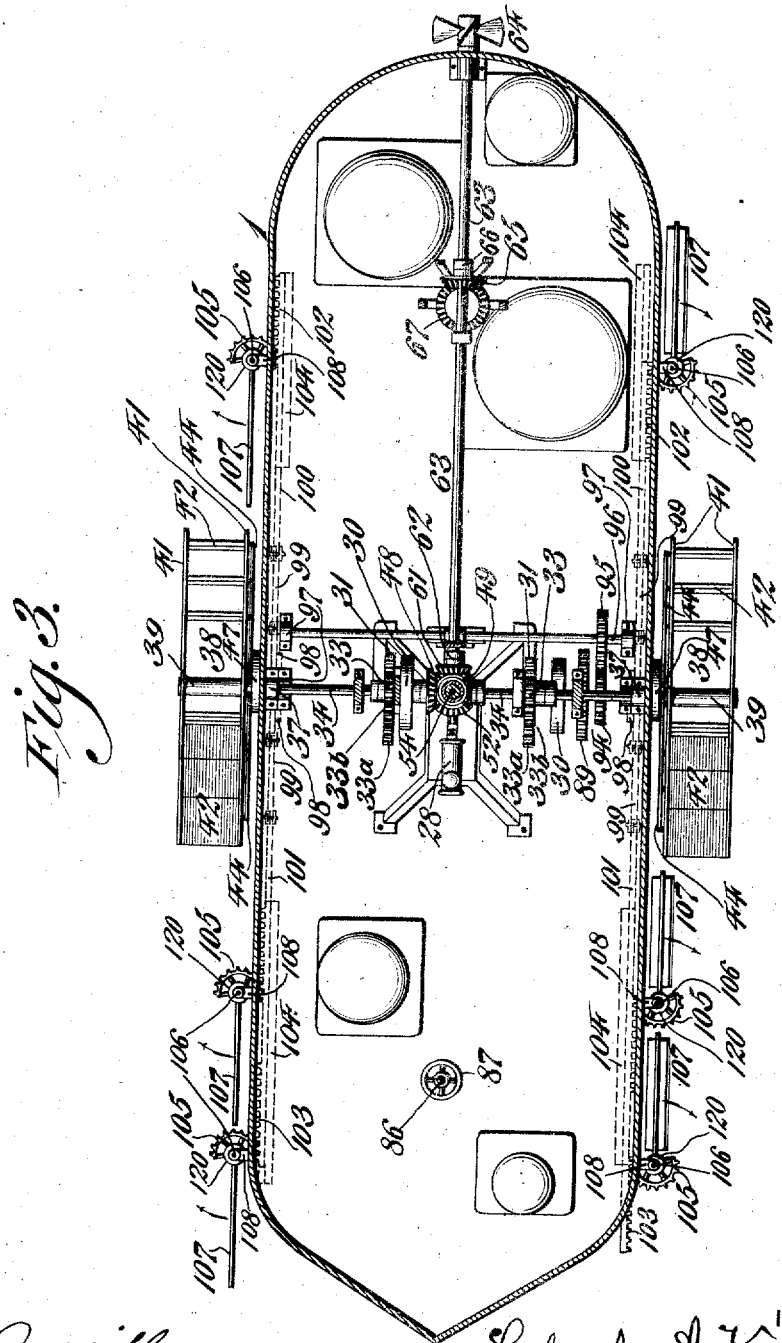

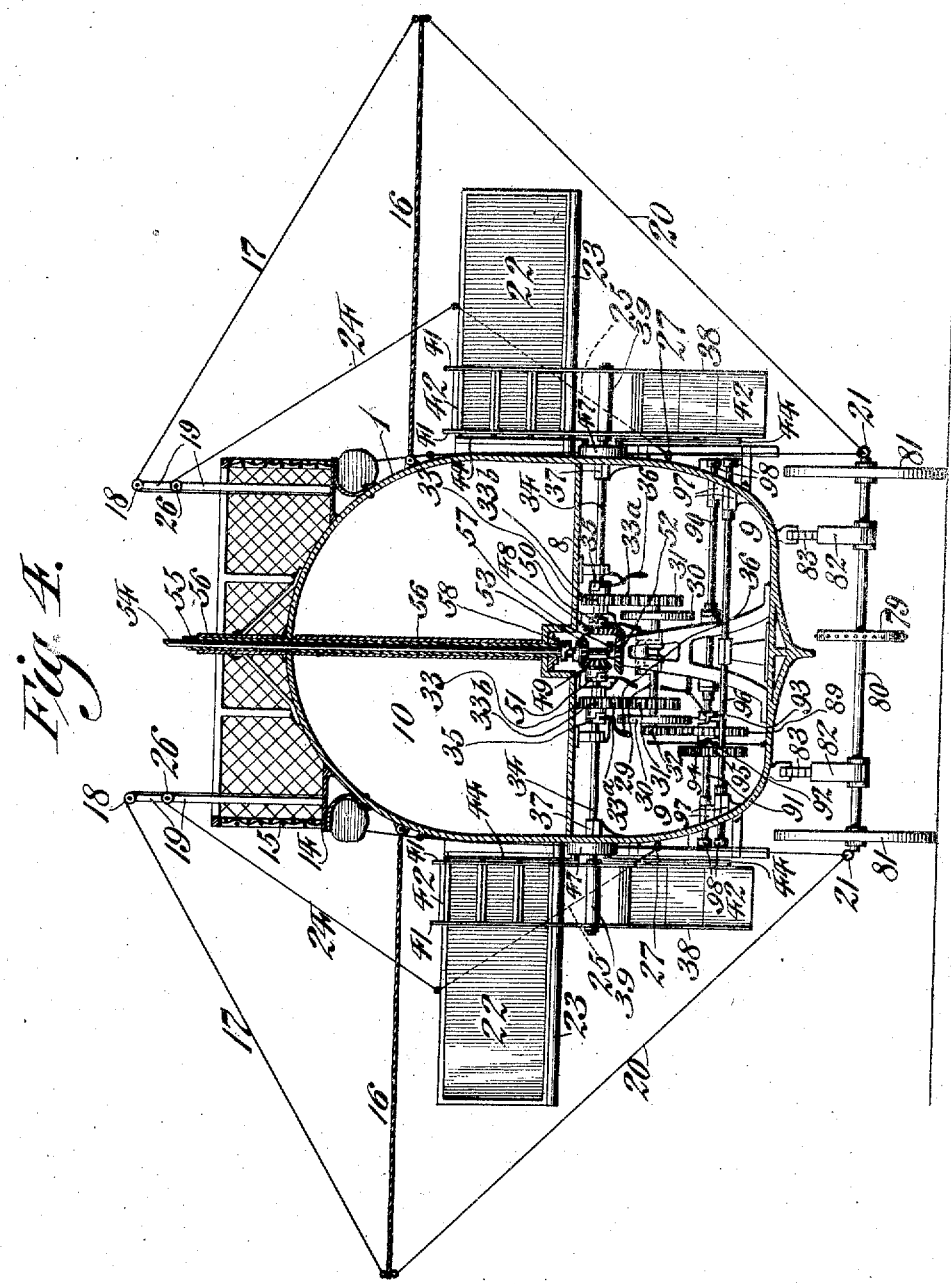

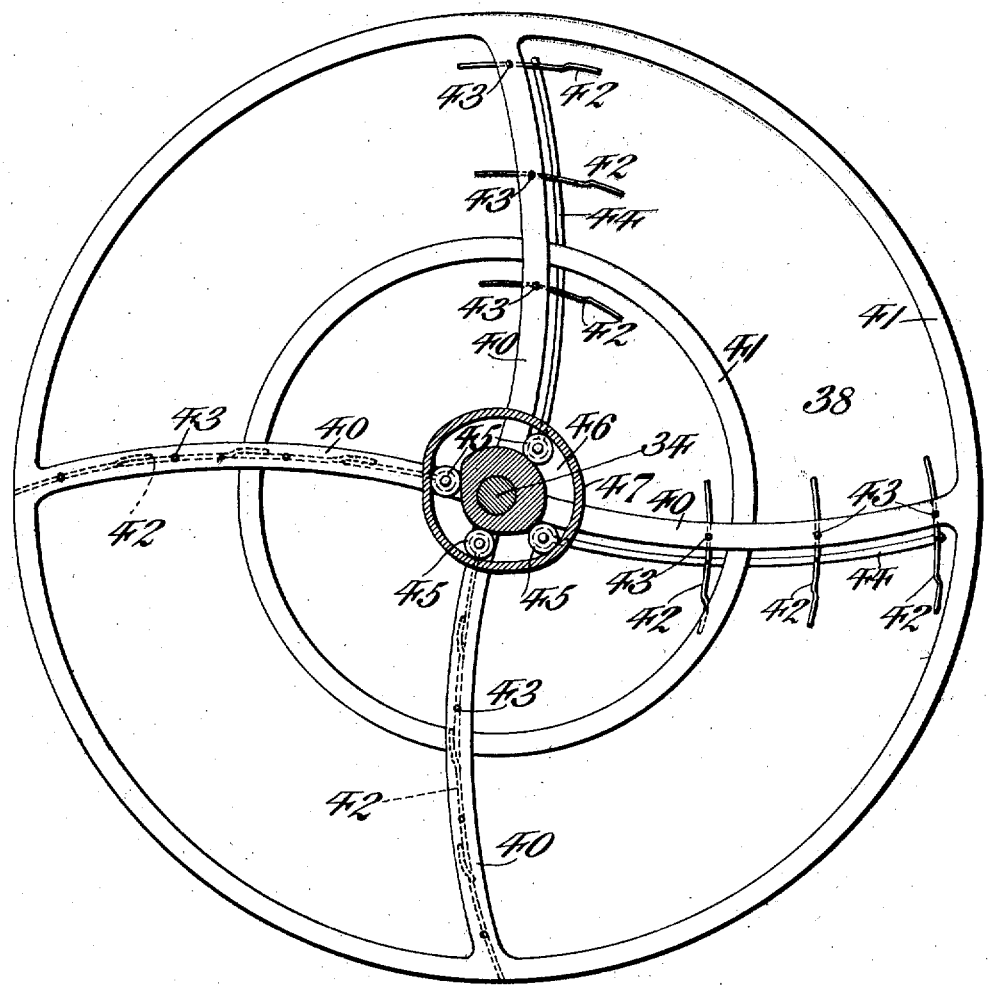

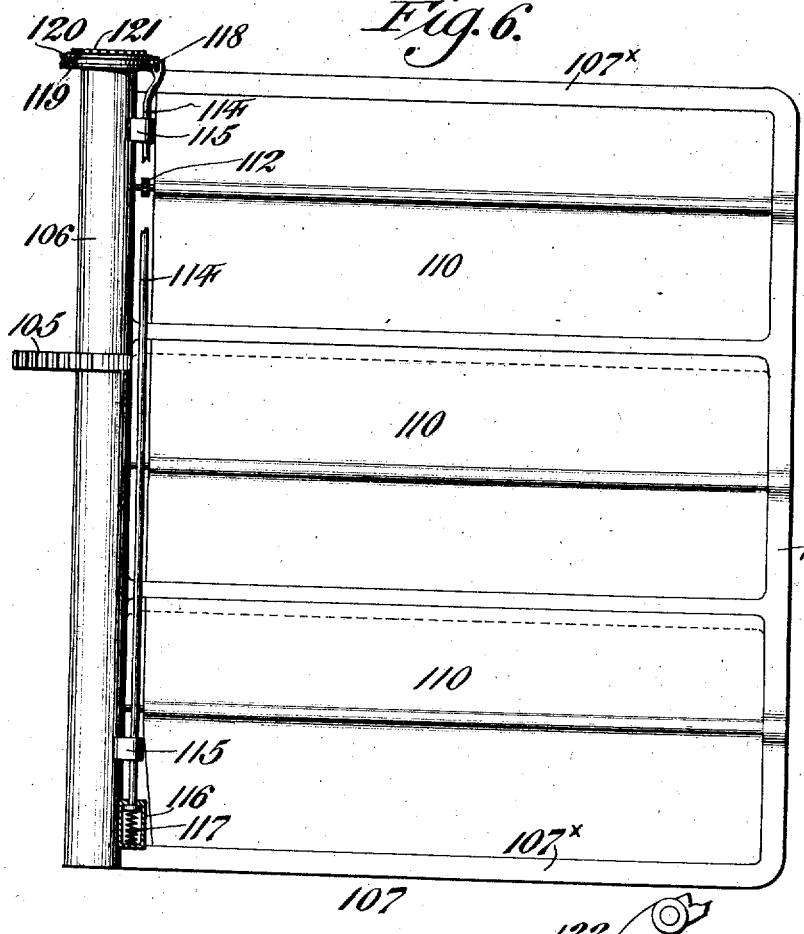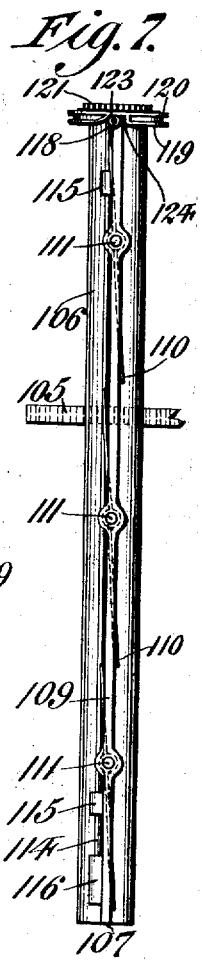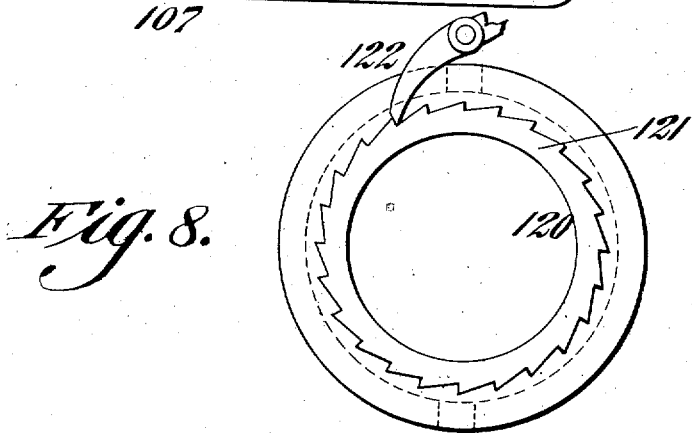

UNITED STATES PATENT OFFICE.

CHARLES A. KUENZEL, OF BUENA VISTA, COLORADO.

AIRSHIP.

987,380.  Specification of Letters Patent.  Patented Mar. 21, 1911.

Application filed April 21, 1910. Serial No. 556,799.

*To all whom it may concern:*

Be it known that I, CHARLES A. KUENZEL, a citizen of the United States, residing at Buena Vista, in the county of Chaffee, State of Colorado, have invented a new and useful Airship, of which the following is a specification.

My invention consists of a dirigible balloon or air ship, constructed to be capable of movement in the air, on water or on land.

It further consists in improved construction of suspending and supporting means of the hull of the balloon.

It also consists in improved means for controlling the movements of the ship in a vertical direction.

It also consists in improved means for horizontally directing the ship.

It also consists in improved means for balancing the ship.

It further consists in improved propelling means.

It also consists in improved details of construction and arrangement of the several instrumentalities for propelling and guiding the ship.

For the purpose of explaining my invention, the accompanying drawing illustrates a satisfactory reduction of the same to practice but the important instrumentalities thereof may be varied, and so it is to be understood that the invention is not limited to the specific arrangement and organization shown and described.

Figure 1 represents a side elevation of my improved air-ship. Fig. 2, a side elevation of the hull of the ship with part of one side broken away and removed, disclosing the lower part of the hull in longitudinal vertical section. Fig. 3 represents a longitudinal horizontal section of the hull. Fig. 4 represents a transverse vertical section of the hull, looking forward. Fig. 5 represents a side view of one of the propelling wheels, illustrating its controlling cam in section and looking outward from the hull. Fig. 6 represents a side view of one of the steering and propelling sails or wings. Fig. 7 represents an edge view of the same. Fig. 8 represents a top view of the ratchet wheel, pawl and cam on the pivot post of such sail. Fig. 9 represents a bottom plan view of said cam. Fig. 10 represents a plan view of the segment and rack for actuating such sail. Fig. 11 represents a detail view of part of the feathering device for such sail. Fig. 12 represents a detail view of the guides and wing-actuating racks.

Similar numerals of reference indicate corresponding parts in the figures.

Referring to the drawings:—1 designates the hull or body 1 of the ship, the same having a tapering bow and a rounded stern, and a cross sectional outline which will enable it to float and be propelled on the water. The hull is supported from a gas bag 2 by means of ropes 3, chains or other similar connections, having their lower ends attached to the arched top of the hull and their upper ends attached to a band 4, which encircles the gas bag at its greatest circumference and is secured to a net-work 5 of cords, which completely incloses the bag. The gas bag is preferably of long egg-shape, with its long axis parallel with that of the hull, and with the pointed end forward, and a relief valve 6 is provided at the upper side of the gas bag and within control from the hull by means of a cord or other suitable contrivance. Tubes 7 are connected in the bottom of the gas bag and extend into the hull to serve for gas communication from suitable reservoirs or generators in the hull into the bag or for withdrawing gas from the bag and compressing or condensing and storing the same for future use. The hull has preferably a deck 8, dividing the same horizontally to form an engine and storage room 9 in the bottom of the hull, and bunk and mess rooms 10, divided by suitable transverse vertical partitions 11. The hull has port-lights 12, and windows 13, for admitting light and air into the same. A platform or upper deck 14 is located over the highest part of the domed hull, and has a suitable railing 15 surrounding it. Steadying planes or balancing planes 16 are hinged with their inner edges to the sides of the hull, below the platform, and said planes have ropes or cords 17 secured to their outer free edges and carried over sheaves 18, in upright stanchions 19, upon the platform, whence they are carried down to the platform or into the hull for convenient manipulation, said cords serving to lift the outer edges of the planes. Ropes or cords 20, are secured to the outer edges of the planes and are carried down, around eyes, 21, or sheaves upon the wheeled truck (to be later described) and thence upward to the platform and hull for convenient manipulation, said latter cords serving to depress the outer edges of the planes. Suitable manipulation of these planes by raising or depressing their outer edges, will serve to tilt the hull to one side or the other, whereby proper balance of the hull is obtained and, when properly adjusted, the planes will maintain the hull on an even keel. Planes 22 are pivoted upon horizontal pintles 23, projecting from the forward and after quarters of the hull, and have their free ends pointing forward. Cords 24 and 25 are secured to the planes and are respectively carried around sheaves 26, upon the stanchions and sheaves 27, upon the hull, and thence to the platform or hull for convenient manipulation, so that the pitch of the planes may be changed and they may be tilted upward or downward, or be held horizontally, to direct the course of the ship upward, downward or horizontally, said planes thus serving as rudders for steering in a vertical plane.

An engine 28, preferably of the internal combustion type, is mounted in the lower hold or engine room of the hull, and actuates a shaft 29, transversely journaled in bearings on the engine frame. Said drive-shaft or power-shaft carries preferably one or more fly-wheels 30, and has two cog-wheels 31, secured upon it and a pinion 32, secured upon it at one end. Said cog-wheels mesh through pinions 33ᵃ and 33ᵇ with pinions 33, which are loose upon two transversely journaled and axially alined propeller-shafts 34, and may be connected to revolve said shafts with them by means of suitable clutches 35, turning with and sliding upon the shafts and operated by levers 36. By these clutch devices, either of the propeller shaft sections may be revolved or stopped independently or jointly. The ends of these shaft sections project beyond their boxes 37, in the sides of the hull, and each shaft section has a propeller-wheel or feathering paddle-wheel 38, secured upon it. One of said wheels is illustrated on an enlarged scale in Fig. 5 of the drawings. Each wheel has a hub 39 secured upon the shaft, and two sets of radiating spokes 40,—four spokes in each set as illustrated. These spokes are braced and connected by concentric rims 41, and the spokes of each set are registering with and opposite to those of the other set.

Vanes 42 are pivoted transversely between the pairs of spokes upon pintles 43, at or about the middle of their side-edges, and the meeting edges of said vanes are preferably overlapping when the latter are tilted in the plane of each pair of spokes. Rods 44 have pivotal connections to the side edges of the vanes, eccentric to the pivots of the same, and inwardly-projecting rollers 45 are journaled at the inner ends of said rods. Said rollers travel in a cam groove 46 in a cam 47, secured upon the side of the hull and having the shaft revolving within it. The cove and flange of this grooved cam is illustrated in section in Fig. 5 as the view is partly sectional, parallel with the side of the hull and through the cam and looking outward to the wheel which is that of the right-hand or starboard side of the hull. The outward bulge in the cam groove is so positioned that the rods will be pushed outward to tilt the vanes to present edgewise on their upward movement, as the wheel revolves, and the rollers pass into the portion having the smaller radius as the spokes and vanes approach the forward horizontal position, drawing the rods inward, tilting the vanes to present their faces to form an unbroken surface, in which position they remain until they have passed the lower vertical position, or for somewhat more than one-third of revolution of the wheel. It will thus be seen that the vanes will meet with and offer substantially no resistance during their inoperative portion in the wheel's revolution, and will present a solid surface to act against the air or water through whichever medium the ship is propelled, when passing downward and rearward, thus propelling the ship forward in the manner of a feathering paddle wheel.

Two bevel-gears 48 and 49 are respectively journaled upon the inner ends of the propeller-shaft 34, and clutches 50 and 51 are provided to connect and disconnect the gears to and from the shafts to be revolved by the same and to remain stationary. Said bevel-gears respectively mesh with bevel-gears 52 and 53, respectively upon a vertical shaft 54 and upon a tubular shaft 55, fitted around the latter and within a guiding and supporting tube 56, extending from the deck 8 and up through the domed top of the hull. Each of the latter bevel-gears has a clutch device respectively 57 and 58 for connecting them with and disconnecting them from their respective shafts. Propellers or helicopters 59 and 60 are respectively secured upon the upper ends of the shafts and respectively serve to raise or depress the hull when rotated, assisting or resisting the lifting action of the gas bag. A bevel-gear 61 meshes with the lower bevel-gear 52 upon the vertical shaft and has a suitable clutch device 62 for connecting it with or disconnecting it from a longitudinally-journaled propeller-shaft 63, the end of which extends through the stern of the hull and carries a screw propeller 64 for propulsion of the hull when on water. A bevel-gear 65 is mounted on the longitudinal propeller shaft and has a clutch device 66 for connecting it with or disconnecting it from the shaft, and said gear meshes with a bevel-gear 67 upon the upper end of a shaft 68, journaled in vertical bearings 69 and 70, and extended down through the bottom of the hull. A bevel-gear 71 is secured upon the lower end of this vertical shaft and meshes with a bevel-gear 72, upon an axle 73 journaled in boxes 74 beneath the bottom of the hull. Springs 75 are preferably interposed between the hull and the boxes. The axle has wheels 76 secured upon it and has a sprocket-wheel 77 secured upon it, around which passes a chain 78 which passes around a sprocket-wheel 79, upon an axle 80, having wheels 81 and journaled in boxes 82 having springs 83. A steering-wheel 84 is journaled between the ends of a fork 85 upon the lower end of a steering-rod 86, journaled through the bottom of the hull and having a wheel 87 upon its upper end or other suitable controlling means. The hull is supported upon these wheels when on land, and is propelled by the drive-wheels and guided by the steering-wheel. An inclined brace or reach 88 is preferably secured at the forward end of the bottom or keel of the hull and to the forward drive-axle to brace the same.

The pinion 32 upon the drive-shaft meshes with a cog-wheel 89 mounted upon a transversely journaled shaft-section 90 in axial alinement with a shaft-section 91, each of which sections has a clutch device 92 and 93 for connecting it with or disconnecting it from the cog-wheel, so that either section may be revolved with the same or both sections may be revolved or stand still. The shaft section 91 has a cog-wheel 94 which meshes with a cog-wheel 95 upon a shaft 96 transversely journaled in the hull. The ends of the shaft sections and of the transverse shaft 96 are journaled in boxes 97 in the sides of the hull and project through the same and have cranks 98 secured upon them. Pitmen 99 are pivoted to said cranks and to bars 100 and 101, having racks 102 and 103 and guided to slide horizontally upon the sides of the hull in dovetail guides 104, secured upon the hull and illustrated in end view and section in Fig. 12 of the drawings. The racks mesh with cogged segments 105, upon pintles or posts 106 of propelling and steering wings or sails 107, which posts are vertically journaled in brackets 108 upon the sides of the hull. In the air ship illustrated in the drawing, two such sails are illustrated as pivoted on each side of the hull near the bow, and one sail on each side of the hull near the stern. The wings or sails have rectangular frames, of which the posts form one side and the other three sides are formed by the arms 107$^x$, radiating from the post at its upper and lower end, and a vertical bar 109 connected to the ends of said arms and parallel with the post.

Vanes 110 have pintles 111 projecting at the middles of their end edges and said pintles are suitably pivoted in the sides of the sail frame formed by the post and the bar parallel thereto. At the ends next to the post, these pintles have cogged segments 112 which are engaged by cogged racks 113 upon a rod 114 guided to slide in bearings 115 upon the post. The lower end of the rod slides in a box 116, upon the post and bears against a spring 117, which tends to force the rod upward to tilt the vanes in their closed position, as illustrated in Figs. 6 and 7 and in dotted lines in Fig. 11. A roller 118 is journaled in the upper end of the rod and bears against a cam-rim 119, upon the under side of a cam-disk 120, revolubly mounted upon the upper end of the post. A ratchet-wheel 121 is secured upon the upper side of the cam-disk and is engaged by a pawl 122, suitably supported from the hull. The cam-ring has two diametrically opposed notches 123, having one side inclined to merge into the rim and the other side 124, at a right angle to the face of the rim to form a shoulder. When the wing or sail is swung forward, the roller on the rod travels out of the notch and into the cam-rim, depressing the rod and tilting the vanes so as to present their edges and thus offer no resistance to the forward movement of the wings. When the wing arrives at its foremost position, the roller on the rod slips into the cam notch and the vanes close so as to offer a solid surface to bear against the air when the wing is swung backward. The pawl will admit of the cam disk rotating with the post and the roller on the rod will remain in the cam notch, bearing against the shoulder. When the wing again swings forward, the pawl will hold the cam disk against rotation so that the roller travels onto the cam-ring until it reaches the opposite notch, when it enters the same and the operation is repeated. The wings thus serve to propel the air ship and, by stopping the wings on one side of the hull and swinging those on the opposite side, the ship may be steered in either direction.

Suitable tanks or containers for water, gas and fuel are located in the hull, and if desired, a suitable apparatus for generating gas to supply the gas bag may be carried.

When the vessel is traveling on water or on land, the gas bag may be deflated and suitably stored on or around the platform, so as not to offer any resistance to the propulsion of the hull.

Having thus described my invention, what I claim as new and desire to secure by Letters Patent, is:—

1. In an air ship, a substantially egg-shaped gas bag, a net inclosing said bag, a band encircling the gas bag at its longest axis and secured to said net, a hull or body suspended from said band, gas connections between the interior of said bag and the interior of said body, vertically pivoted propelling and steering sails upon opposite sides of the body and composed of vanes pivoted to rock upon horizontal axes, means for oscillating said sails upon their vertical axes, and independent means pivotally connected to one edge of each vane to simultaneously rock them.

2. In an air ship, a gas bag, a hull suspended from said bag, a motor within the hull, propelling means for said hull and connected to be driven by said motor, drive wheels journaled beneath the bottom of the hull and connected to be driven by the motor, a steering wheel mounted beneath the bottom of the hull, vertically pivoted propelling and steering sails upon opposite sides of the hull and composed of vanes pivoted to rock upon horizontal axes, means for oscillating said sails upon their vertical axes, and independent means pivotally connected to one edge of each vane to simultaneously rock them.

3. A propelling and steering sail for air ships, consisting of a frame pivoted at one edge, vanes pivoted at the middles of their ends in said frame to present edgewise or form a solid surface, a rod pivotally connected to one edge of each vane to simultaneously rock them, means for oscillating the sail, and means connected to the rod to longitudinally move the same to open and close the vanes.

4. In a propelling and steering sail for air ships, a rectangular frame having one side-piece constituting a pivot post, means for oscillating such frame, vanes pivoted at the middles of their ends in said frame, pinions on the pintles of said vanes, a rod guided on the pivot post and having racks engaging said pinions, a cam disk movable upon the pivot post and having a cam rim formed with diametrically opposite notches one side of which forms a straight shoulder and against which run the end of the rod bears, a ratchet upon said cam disk, a pawl engaging said ratchet, and a spring attached to the rod to hold the end of the same against the cam rim.

CHARLES A. KUENZEL.

Witnesses:
WM. H. HECKLER,
CHAS. HERRLE.